(12) United States Patent
Kong et al.

(10) Patent No.: US 11,296,600 B2
(45) Date of Patent: Apr. 5, 2022

(54) BUCK CONVERTER

(71) Applicant: Research & Business Foundation Sungkyunkwan University, Suwon-si (KR)

(72) Inventors: Bai Sun Kong, Suwon-si (KR); Jung Duk Suh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 204 days.

(21) Appl. No.: 16/790,816

(22) Filed: Feb. 14, 2020

(65) Prior Publication Data

US 2020/0266707 A1 Aug. 20, 2020

(30) Foreign Application Priority Data

Feb. 14, 2019 (KR) .......................... 10-2019-0017455

(51) Int. Cl.
*H02M 3/158* (2006.01)
*H02M 1/14* (2006.01)

(52) U.S. Cl.
CPC .............. *H02M 3/158* (2013.01); *H02M 1/14* (2013.01)

(58) Field of Classification Search
CPC .... H02M 1/0064; H02M 1/0083; H02M 1/12; H02M 1/14; H02M 1/15; H02M 3/156; H02M 3/1566; H02M 3/158
See application file for complete search history.

(56) References Cited

U.S. PATENT DOCUMENTS

| | | | |
|---|---|---|---|
| 8,018,217 B2* | 9/2011 | Chen ..................... | H02M 3/158 323/288 |
| 8,947,065 B2* | 2/2015 | Chiang ................. | H02M 3/158 323/288 |
| 2009/0278516 A1* | 11/2009 | Bhagwat ............. | H02M 3/1588 323/270 |
| 2013/0038310 A1* | 2/2013 | Menegoli ............. | H02M 3/156 323/288 |
| 2018/0262107 A1* | 9/2018 | Raval .................... | H02M 3/158 |
| 2019/0305566 A1* | 10/2019 | Hsu ......................... | H02J 7/008 |
| 2021/0006245 A1* | 1/2021 | Kong ................. | H03K 17/6871 |

FOREIGN PATENT DOCUMENTS

| KR | 10-1574300 B1 | 12/2015 |
|---|---|---|
| KR | 10-1772795 B1 | 8/2017 |

OTHER PUBLICATIONS

Korean Office Action dated Feb. 2, 2021 in counterpart Korean Application No. 10-2019-0017455 (2 pages in Korean).

(Continued)

*Primary Examiner* — Matthew V Nguyen
(74) *Attorney, Agent, or Firm* — NSIP Law (57) ABSTRACT

The present disclosure relates to a buck converter which includes a voltage converter configured to convert an input voltage into an output voltage by a driving signal, a compensator configured to generate an error compensation signal by receiving a feedback signal defined from the output voltage, an active ramp controller configured to generate a ramp signal by adjusting a ramp bias voltage when load transient occurs, and an output voltage controller configured to adjust the output voltage using the ramp signal and the error compensation signal.

16 Claims, 10 Drawing Sheets

(56) References Cited

OTHER PUBLICATIONS

Korean Office Action dated Aug. 1, 2020 in corresponding Korean Patent Application No. 10-2019-0017455 (4 pages in Korean).
Chang et al., "Fast Output Voltage-Regulated PWM Buck Converter With an Adaptive Ramp Amplitude Control," IEEE Transactions On Circuits and Systems—II: Express Briefs, vol. 60, No. 10, Oct. 2013, pp. 712-716.

* cited by examiner

TRANSIENT DETECTOR(200)

RAMP GENERATOR(400)

BUCK CONVERTER

CROSS-REFERENCE TO RELATED APPLICATIONS

This application claims the benefit under 35 USC 119(a) of Korean Patent Application No. 10-2019-0017455 filed on Feb. 14, 2019, in the Korean Intellectual Property Office, the entire disclosure of which is incorporated herein by reference for all purposes.

BACKGROUND

1. Field

The present disclosure relates to a buck converter, and more particularly, to a buck converter which changes a waveform of a ramp signal in the event of load transient to track a shape of an output of an error amplifier to provide a full duty, to reduce undershoot/overshoot and reduce a response speed at the time of switching a mode.

2. Description of the Related Art

Voltage regulation is frequently required to prevent variations in supply voltages in various micro devices such as digital ICs, semiconductor memories, display modules, hard disk drives, RF circuits, microprocessors, digital signal processors, and analog ICs, and especially in applications which use batteries such as cellular phones, notebook computers and consumer products.

These regulators are called DC-DC converters because their battery or DC input voltages often have to be stepped up to higher DC voltages or stepped down to lower DC voltages. A step-up converter, commonly called a boost converter, is necessary when a battery voltage is lower than a voltage required to supply power to a load. The step-up converter may include an inductive switching regulator or a capacitive charge pump. In contrast, a stepdown converter, commonly called a buck converter, is used when a battery voltage is higher than the desired load voltage. The step-down converter may include an inductive switching regulator, a capacitive charge pump, and a linear regulator.

Various attempts to improve a response characteristic of the above-mentioned buck converter have been studied.

In the meantime, a PWM buck converter uses an LC filter so that complex poles are generated. Therefore, a type-3 compensating circuit is used to compensate for the complex poles. However, in the type-3 compensating circuit, a large capacitor is necessary to filter a bandwidth used for a high-frequency path. As such a large capacitor is used, when a sleep mode is switched to an active mode or an active mode is switched to a sleep mode, there is a drawback in that significant undershoot/overshoot is generated and response speed is slow.

Therefore, it is desired to improve a technology for reducing undershooting/overshooting of a buck converter, which may be a drawback of the type-3 compensating circuit used for the PWM buck converter, and may reduce the response speed at the time of switching a mode.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present disclosure is to provide a buck converter which is capable of reducing the undershoot/overshoot which is the drawback of the type-3 compensating circuit used for the PWM buck converter and reducing the response speed at the time of switching a mode.

Technical problems of the present disclosure are not limited to the above-mentioned technical problem(s), and other technical problem(s), which is (are) not mentioned above, can be clearly understood by those skilled in the art from the following descriptions.

According to an aspect of the present disclosure, a buck converter includes: a voltage converter configured to convert an input voltage into an output voltage by a driving signal; a compensator configured to generate an error compensation signal by receiving a feedback signal defined from the output voltage; an active ramp controller configured to generate a ramp signal by adjusting a ramp bias voltage when a load transient occurs; and an output voltage controller configured to adjust the output voltage using the ramp signal and the error compensation signal.

The voltage converter may include: a switching unit configured by at least one switch transistor; and a filter unit configured to generate an output voltage by being supplied with a current from the switching unit.

When the load transient occurs, the active ramp controller may generate a ramp signal such that a waveform of the ramp signal tracks a shape of an output waveform of the compensator by adjusting the ramp bias voltage.

The active ramp controller may include: a transient detector configured to determine a load transient state based on a difference between the output voltage and a reference voltage and output a transient state signal in accordance with a determination result; a ramp bias generator configured to adjust a ramp bias voltage based on the error compensation signal when the load transient occurs; a ramp bias selector configured to select a ramp bias voltage generated from the ramp bias generator when the transient state signal is received; and a ramp generator configured to generate a ramp signal which tracks the error compensation signal based on the selected ramp bias voltage.

The transient detector may include an amplifier configured to generate an amplification signal $V_{CON}$ by amplifying a difference between the output signal and the reference signal; first and second comparators configured to compare the amplification signal with an over threshold bias voltage $V_{B\_over}$ or an under threshold bias voltage $V_{B\_under}$ to generate an overshoot transient detection signal TD_A or an undershoot transient detection signal TD_B; and an OR gate configured to determine whether a transient state occurs through outputs of the first and second comparators.

When the amplification signal is higher than the over threshold bias voltage $V_{B\_over}$, the first comparator outputs an overshoot transient detection signal to be high and when the first comparator outputs the overshoot transient detection signal to be high, the OR gate outputs the transient state signal to be high.

When the amplification signal is lower than the under threshold bias voltage $V_{B\_under}$, the second comparator outputs an undershoot transient detection signal to be high and when the second comparator outputs the undershoot transient detection signal to be high, the OR gate outputs the transient state signal to be high.

The ramp bias generator may include: a first level shifter which when overshoot occurs, shifts a level of the error compensation signal to generate a first high ramp bias voltage and a first low ramp bias voltage and a second level shifter which when undershoot occurs, shifts a level of the error compensation signal to generate a second high ramp bias voltage and a second low ramp bias voltage.

The ramp bias selector may when overshoot occurs, select a first high ramp bias voltage and a first low ramp bias voltage as ramp bias voltages and when undershoot occurs, select a second high ramp bias voltage and a second low ramp bias voltage as ramp bias voltages.

The ramp generator may include: a capacitor $C_{RAMP}$ into which a bias current $I_{BIAS}$ flows; an SR latch which when the voltage of the ramp signal $V_{RAMP}$ rises by the bias current to a high bias voltage $V_H$ selected by the ramp bias selector, outputs a reset signal and when the voltage of the ramp signal is lowered to a low bias voltage $V_L$ selected by the ramp bias selector, causes the reset signal to be off; and a reset transistor $M_{RESET}$ which is turned on by the reset signal to lower a voltage of a ramp signal and when the reset signal is off, is turned off to raise the voltage of the ramp signal so that the ramp signal is output, and the ramp signal is a signal having a shape corresponding to an error compensation signal.

According to the present disclosure, an active ramp tracking control technique is used for the PWM buck converter so that the undershoot/overshoot is reduced and the response speed at the time of switching a mode is reduced.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

An object of the present disclosure is to provide a buck converter that is capable of reducing an undershoot/overshoot of a buck converter. The undershoot/overshoot is a typical drawback of the type-3 compensating circuit used for the PWM buck converter, and reduces the response speed at the time of switching a mode.

Technical problems of the present disclosure are not limited to the above-mentioned technical problem(s), and other technical problem(s), which is (are) not mentioned above, can be clearly understood by those skilled in the art from the following descriptions.

Figure 1:
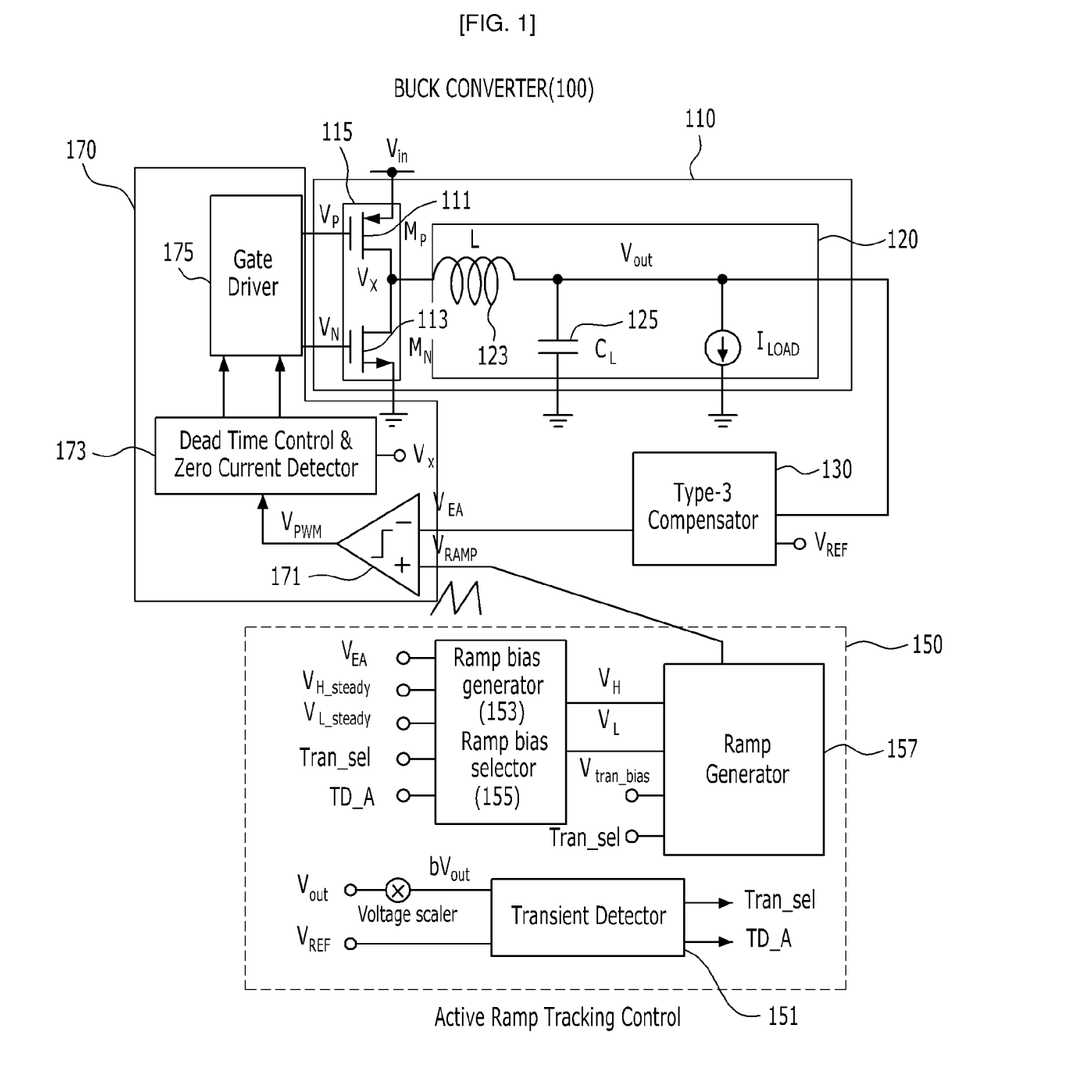
FIG. 1 is a view illustrating an example of a buck converter.

FIG. 1 is a view illustrating an example of a buck converter according to an embodiment of the present disclosure.

Referring to FIG. 1, a buck converter 100 may include a voltage converter 110, a compensator 130, an active ramp controller 150, and an output voltage controller 170.

The voltage converter 110 may convert an input voltage into an output voltage by a driving signal. The voltage converter 110 may include a switching unit 115 and a filter unit 120. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The switching unit 115 may control a switch that supplies a current to the filter unit 120 to generate the output voltage $V_{OUT}$ by the input voltage in accordance with a driving signal generated in a gate driver 175.

The switching unit 115 may include at least one switch transistor. That is, for example, the switching unit 115 may include a PMOS power transistor $M_P$ 111 and an NMOS power transistor $M_N$ 113 as switch transistors. The switching unit 115 may convert an input voltage $V_{in}$ into an output voltage $V_{out}$ in accordance with a gate voltage VP applied to a gate terminal of the P-type transistor $M_P$ 111 and a gate voltage VN applied to a gate terminal of the N-type transistor $M_N$ 113.

For example, when a PWM signal is a high signal, the switching unit 115 turns on the PMOS power transistor 111 and turns off the NMOS power transistor 113 by a driving signal. Further, for example, when the PWM signal is a low signal, the switching unit 115 turns off the PMOS power transistor 111 and turns on the NMOS power transistor 113.

The filter unit 120 may be a configuration which is supplied with a current from the switching unit 115 to generate an output voltage and may include an inductor L 121 whose one end is connected to the switching unit 115 and a capacitor C 123 which is connected to the other end of the inductor L 121 in series. A current source Iload 125 may be a modeling of a load current.

The compensator 130 may be a type-3 compensation network and amplifies a difference between a predetermined reference voltage $V_{REF}$ and the output voltage $V_{OUT}$ to output an error compensation signal. In this example, the compensator 130 may be referred to as an error amplifier.

The compensator 130 may output a compensation signal to compensate for an error in accordance with an error signal.

The active ramp controller (active ramp tracking control) 150 may control a ramp bias voltage to generate a ramp signal when load transient is generated. That is, the active ramp tracking control 150 causes a waveform of a ramp signal $V_{RAMP}$ to track an output waveform of the compensator 130 in a load transient interval to provide a full duty.

Specifically, when an undershoot of the output voltage occurs due to a sudden increase in the load current, the active ramp controller 150 may provide a waveform of the ramp signal $V_{RAMP}$ which follows an error compensation signal $V_{EA}$ which is an output voltage of the compensator 130 and has a small value to provide a full duty to the PWM signal $V_{PWM}$. In contrast, when overshoot occurs due to a sudden decrease in the load current, the active ramp controller provides a high voltage while the waveform of the ramp signal $V_{RAMP}$ follows a shape of the error compensation signal $V_{EA}$ to provide a full duty to the PWM signal $V_{PWM}$. Therefore, as compared with the buck converter of the related art, the undershoot/overshoot is relatively small, and the response speed is relatively fast.

The active ramp controller 150 may include a ramp generator 157, a transient detector 151, a ramp bias generator 153, and a ramp bias selector 155.

Figure 2A:
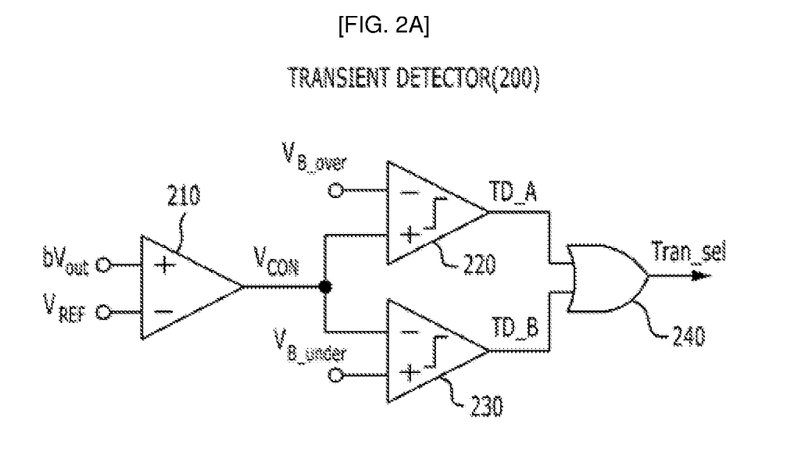
FIG. 2A is diagram depicting an example of a transient detector.

The transient detector 151 may determine a load transient state based on a difference between an output voltage and the reference voltage and may output a transient state signal in accordance with a determination result. The transient detector 151 will be described in more detail with reference to FIG. 2.

Figure 3A:
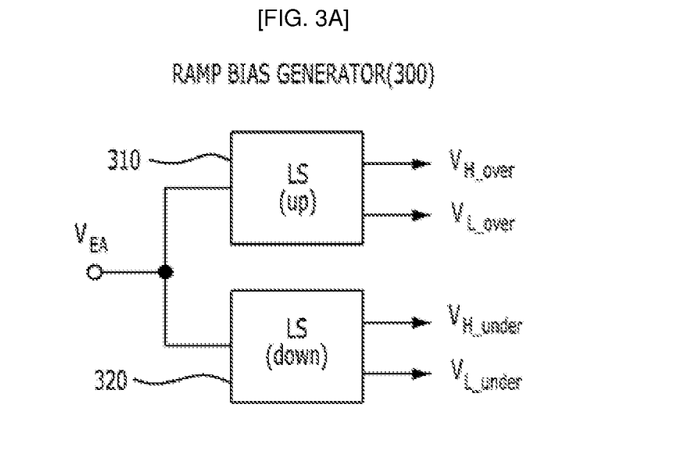
FIGS. 3A and 3B are diagrams depicting examples of a ramp bias generator and a ramp bias selector, respectively.

When the load transient state is generated, the ramp bias generator 153 may generate a ramp bias voltage based on the error compensation signal. The ramp bias generator 153 will be described in more detail with reference to FIG. 3.

Figure 3B:
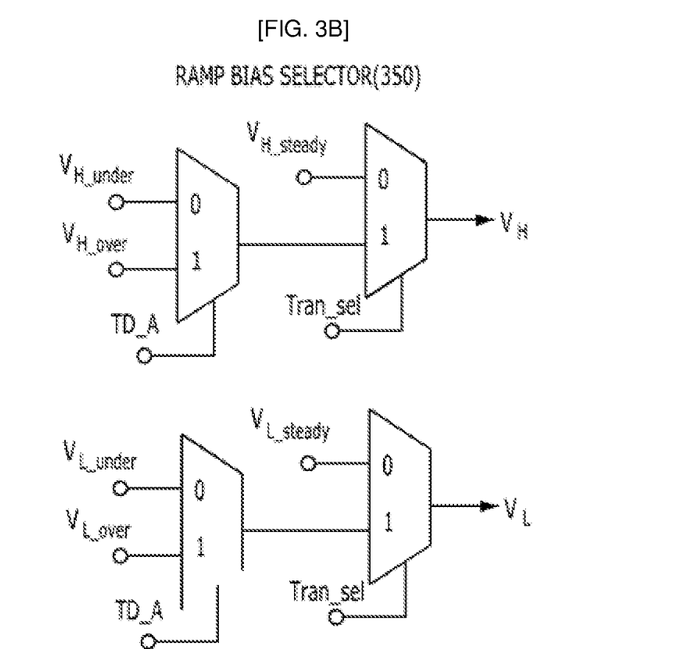

When a transient state signal is received, the ramp bias selector 155 selects a ramp bias voltage generated in the ramp bias generator 153. The ramp bias selector 155 will be described in more detail with reference to FIG. 3.

The ramp generator 157 may generate a ramp signal which tracks an error compensation signal based on a ramp bias voltage selected by the ramp bias selector 155. The ramp generator 157 will be described in more detail with reference to FIG. 4.

The output voltage controller 170 adjusts an output voltage using the ramp signal and the error compensation signal. The output voltage controller 170 may include a comparator 171, a dead time controller and zero current detector 173, and a gate driver 175.

The comparator 171 may compare the ramp signal generated from the active ramp controller 150 and the error compensation signal output from the compensator 130 and may output a PWM signal having the comparison result.

The dead-time controller and zero current detector 173 and the gate driver 175 are components included in the buck converter of the related art and the functions thereof are the same as the related art so that a specific description will be omitted.

Figure 2B:
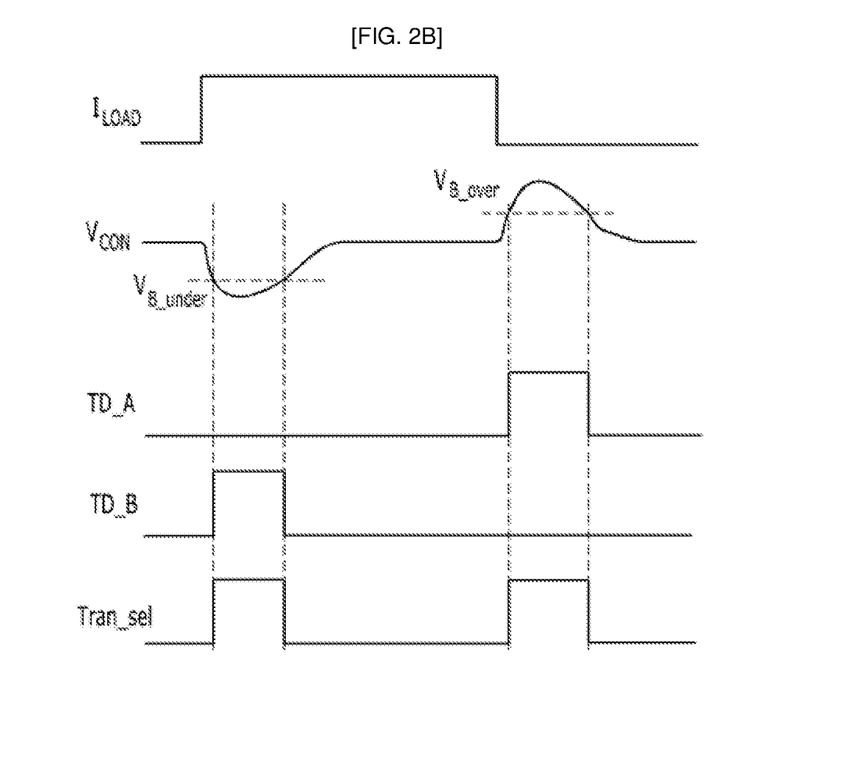
FIG. 2B is a waveform depicting an example a transient detector.

FIG. 2 is a view for describing a transient detector according to an embodiment of the present disclosure.

Referring to FIG. 2, the transient detector 200, according to the embodiment of the present disclosure, may include an amplifier 210, a first comparator 220, a second comparator 230, and an OR gate 240.

The amplifier 210 amplifies the difference between the output signal and the reference signal to generate an amplification signal $V_{CON}$.

The first and second comparators 220 and 230 compare the amplification signal amplified by the amplifier 210 with an over threshold bias voltage $V_{B\_over}$ and an under threshold bias voltage $V_{B\_under}$ to generate an overshoot transient detection signal TD_A and an undershoot transient detection signal TD_B. That is, when the amplification signal is higher than the over threshold bias voltage $V_{B\_over}$, the first comparator 220 may output the overshoot transient detection signal to be high and when the amplification signal is lower than the under threshold bias voltage $V_{B\_under}$, the second comparator 230 may output the undershoot transient detection signal to be high.

The OR gate 240 may determine whether the transient state occurs through the outputs of the first and second comparators 220 and 230. That is, when the first comparator 220 outputs the overshoot transient detection signal to be high, the OR gate 240 outputs the transient state signal to be high and when the second comparator 230 outputs the undershoot transient detection signal to be high, the OR gate 240 outputs the transient state signal to be high.

Hereinafter, an operation of the transient detector 200 configured, as described above, will be described.

The amplification signal $V_{CON}$ may be generated by the amplifier 210, which amplifies a difference between $V_{out}$ and $V_{REF}$. When the load current is suddenly increased or decreased, the output voltage fluctuates so that $V_{CON}$ also fluctuates. A voltage of the amplification signal $V_{CON}$ is compared with $V_{B\_over}$ and $V_{B\_under}$ through the first and second comparators 220 and 230 to generate TD_A and TD_B and may determine whether the load transient occurs by the OR gate 240.

Referring to FIG. 2B, in an existing steady-state, both TD_A and TD_B are low so that the value of the transient state signal Tran_sel is also low. When undershoot occurs so that $V_{CON}$ is lower than the bias voltage $V_{B\_under}$, TD-B is high so that the value of the transient state signal Tran_sel is high. When an overshoot occurs, TD_A value is high so that the value of the transient state signal is high.

The transient detector 200 configured, as described above, may detect whether a load transient situation occurs and detect whether it is undershoot or overshoot.

FIG. 3 is a view for explaining a ramp bias generator and a ramp bias selector according to an embodiment of the present disclosure.

Referring to FIG. 3A, the ramp bias generator 300 according to the embodiment of the present disclosure may include a first level shifter 310 and a second level shifter 320.

When an overshoot occurs, the first level shifter 310 shifts a level of the error compensation signal to generate a first high ramp bias voltage and a first low ramp bias voltage.

When undershoot occurs, the second level shifter 320 shifts a level of the error compensation signal to generate a second high ramp bias voltage and a second low ramp bias voltage.

The ramp bias generator 300 may generate a ramp bias voltage from the output voltage of the error amplifier using the level shifter.

When the load transient situation occurs, the ramp bias selector 350 selects ramp bias voltages $V_H$ and $V_L$ used for the ramp generator 300.

Referring to FIG. 3B, the ramp bias selector 350 uses steady bias voltages $V_{H\_steady}$ and $V_{L\_steady}$ in the existing steady-state. When an overshoot occurs, the ramp bias selector 350 selects the first high ramp bias voltage and the first low ramp bias voltage as ramp bias voltages, and when an undershoot occurs, the ramp bias selector 350 selects the second high ramp bias voltage and the second low ramp bias voltage as ramp bias voltages. That is, when overshoot occurs, the $V_{RAMP}$ signal needs to be higher than $V_{EA}$ so that the first high ramp bias voltage $V_{H\_over}$ and the first low ramp bias voltage $V_{L\_over}$ are used. When undershoot occurs, the $V_{RAMP}$ signal needs to be lower than $V_{EA}$ so that the second high ramp bias voltage $V_{H\_under}$ and the second low ramp bias voltage $V_{L\_under}$ are used.

Figure 4:
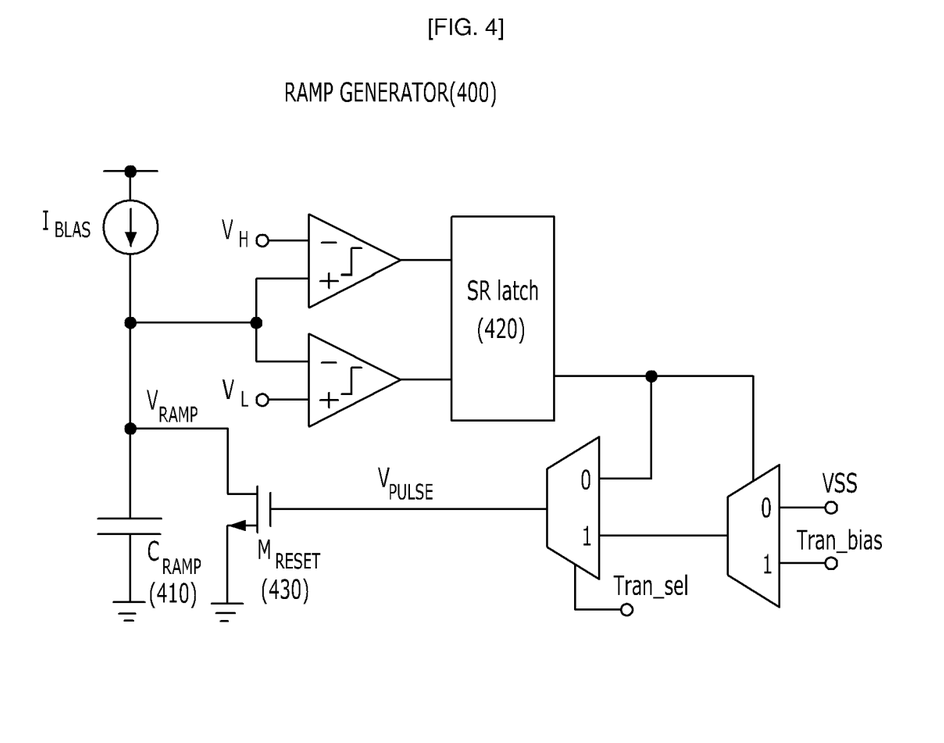
FIG. 4 is a diagram depicting an example of a ramp generator.

FIG. 4 is a view for describing a ramp generator according to an embodiment of the present disclosure.

Referring to FIG. 4, the ramp generator 400, according to the embodiment of the present disclosure, may include a capacitor $C_{RAMP}$ 410 into which a bias current $I_{BIAS}$ flows, an SR latch 420, and a reset transistor $M_{RESET}$ 430.

When the voltage of the ramp signal $V_{RAMP}$ rises due to the bias current to a high bias voltage $V_H$ selected by the ramp bias selector, the SR latch 420 may output a reset signal and when the voltage of the ramp signal is lowered to a low bias voltage $V_L$, the SR latch 420 causes the reset signal to be off.

The reset transistor 430 may be turned on by the reset signal to lower a voltage of a ramp signal, and when the reset signal is off, the reset transistor 430 is turned off to raise the voltage of the ramp signal so that the ramp signal is output.

Hereinafter, an operation of the ramp generator 400 configured as described above will be described.

When the bias current $I_{BIAS}$ flows into the capacitor $C_{RAMP}$ and the voltage $V_{RAMP}$ rises. When the voltage $V_{RAMP}$ is raised to $V_H$, the SR latch 420 may generate a reset signal to turn on the reset transistor $M_{RESET}$ 430. When the reset transistor $M_{RESET}$ 430 is turned on, the charge of the capacitor $C_{RAMP}$ is discharged to lower the voltage $V_{RAMP}$. When the voltage $V_{RAMP}$ is lowered to $V_L$, the reset signal in the SR latch 420 is off, and the reset transistor $M_{RESET}$ 430 is turned off. Therefore, the voltage $V_{RAMP}$ is raised to form a ramp waveform. In an interval in which a current is constant, the same waveform as the $V_{RAMP}$ waveform of the related art is formed. When a load current is suddenly changed so that an output voltage is changed by predetermined values or higher, bias values of the gate voltages of $V_H$, $V_L$, and $M_{RESET}$ are adjusted to create $V_{RAMP}$ following a shape of $V_{EA}$.

Figure 5:
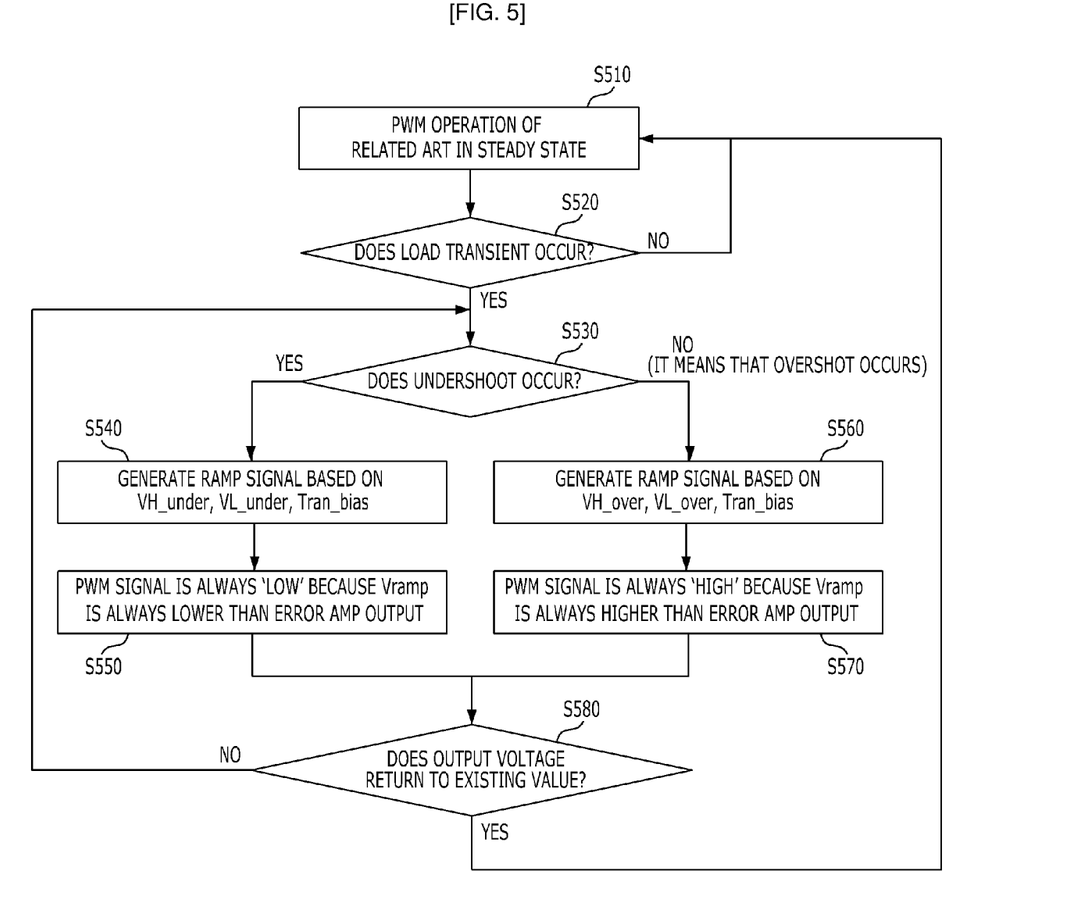
FIG. 5 is a diagram depicting an example of a PWM signal control method.

FIG. 5 is a view for explaining a PWM signal control method according to an embodiment of the present disclosure.

Referring to FIG. 5, in a normal state, the buck converter operates as the same as the buck converter of the related art (S510) and determines whether the load transient occurs (S520). That is, the buck converter determines whether the load transient occurs based on the difference between the output voltage and the reference voltage.

As a result of the determination of step S520, when the load transient occurs, the buck converter determines whether undershoot occurs (S530). When the load current is suddenly raised, the undershoot is found at $V_{out}$.

As a result of the determination of step S530, when the undershoot occurs, the buck converter generates a ramp signal based on the second high ramp bias voltage and the second low ramp bias voltage generated based on the error compensation signal (S540).

Since the ramp signal is lower than an output of the error compensation signal by performing step S540, the buck converter outputs a low PWM signal (S550). That is, when the bias voltage of the ramp signal is adjusted, the ramp signal is always lower than the error compensation signal $V_{EA}$. Therefore, since the ramp voltage is always lower than an output voltage of the compensator (the error amplifier), the PWM signal has a full duty cycle.

As a result of the determination of step S530, when the overshoot occurs, the buck converter generates a ramp signal based on the first high ramp bias voltage and the first low ramp bias voltage generated based on the error compensation signal (S560).

Since the ramp signal is lower than an output of the error compensation signal by performing step S560, the buck converter outputs a high PWM signal (S570). That is, when the load current is suddenly lowered, overshoot occurs, and when the bias voltage of the ramp signal is adjusted, the ramp signal always has a voltage higher than that of the error amplifier.

The ramp signal always has a voltage higher than that of the compensator (the error amplifier) so that the PWM signal always has a zero duty cycle. Therefore, the full duty signal is supplied by using a ramp signal following the output waveform of the error amplifier. By doing this, the size of the overshoot/undershoot is reduced, and a response speed faster than that in the load transient state may be allowed.

To summarize the above-described processes, in a normal state, the reset voltage is used as VDD to quickly lower the voltage of the ramp signal, but in the transient state, the reset voltage needs to be adjusted so as not to quickly lower the voltage of the ramp signal. When the reset voltage is used as a steady voltage, a ramp waveform may not follow an output waveform of the error amplifier. Therefore, a ramp waveform having a shape of the output waveform of the error amplifier is generated by adjusting a ramp bias voltage. The PWM signal may have a full duty in the load transient state due to this ramp waveform.

Figure 6A:
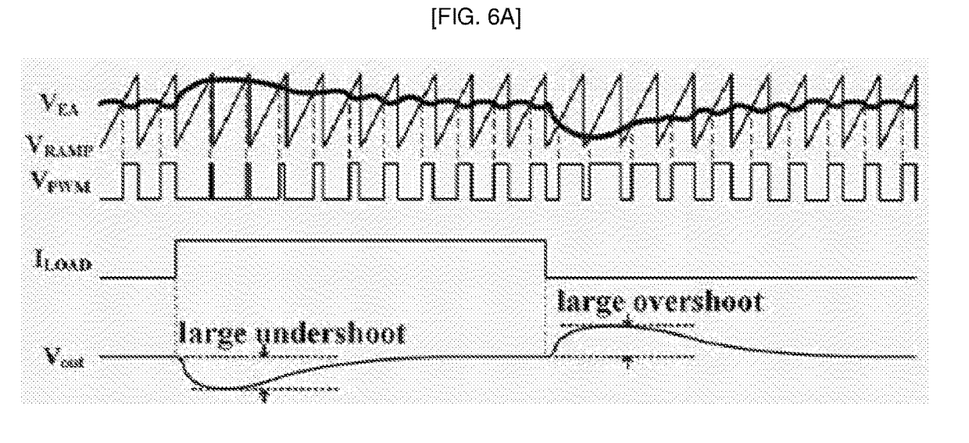
FIGS. 6A and 6B are diagrams depicting examples obtained by comparing an operation waveform a PWM buck converter of the related art and an operation waveform of a PWM buck converter of the present disclosure.
Figure 6B:
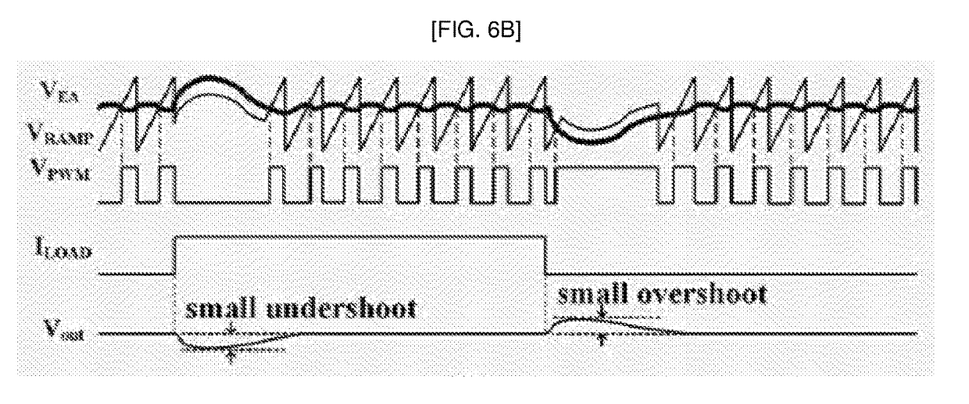

FIG. 6 is a view obtained by comparing an operation waveform of a PWM buck converter of the related art and an operation waveform of a PWM buck converter of the present disclosure.

Referring to FIG. 6, the PWM buck converter of the related art uses a large capacitor in the type-3 compensating circuit so that a narrow bandwidth and a slewing problem may occur. For this reason, as illustrated in FIG. 6A, when a load current suddenly increases or decreases, an output voltage of the error amplifier slowly moves so that a full duty is not provided to the $V_{PWM}$ signal. Therefore, undershoot and overshoot are large, and the response speed is slow.

FIG. 6B is an operation waveform of the present disclosure, and when the load current suddenly increases so that the undershoot is generated in the output voltage, the waveform of the ramp signal $V_{RAMP}$ is provided to have a small value while following the error compensation signal $V_{EA}$ which is an output voltage of the error amplifier so that the full duty is provided to the $V_{PWM}$ signal. In contrast, when the load current is suddenly decreased so that the overshoot occurs, the waveform of $V_{RAMP}$ follows the shape of $V_{EA}$ to provide a high voltage so that full duty is provided to the $V_{PWM}$ signal. Therefore, as compared with the circuit of the related art, the undershoot/overshoot is relatively small and the response speed is relatively fast.

FIG. 7 is a view of an experiment result of comparing an active ramp tracking control technology according to an embodiment of the present disclosure with the related art to verify the improvement of the undershoot/overshoot size and the response speed.

Figure 7A:
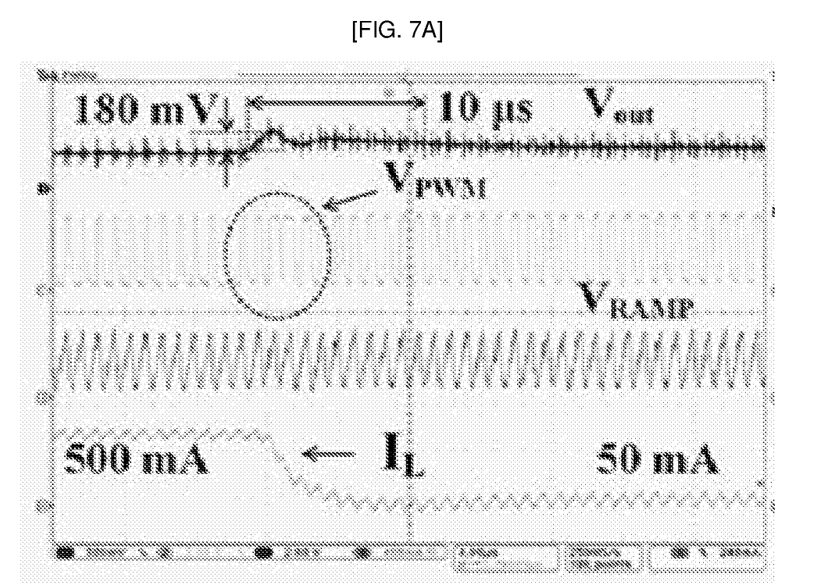
FIGS. 7A to 7D diagrams depicting experimental results of comparing an active ramp tracking control technology according to an embodiment of the present disclosure with the related art to verify the improvement of the undershoot/overshoot size and the response speed.
Figure 7B:
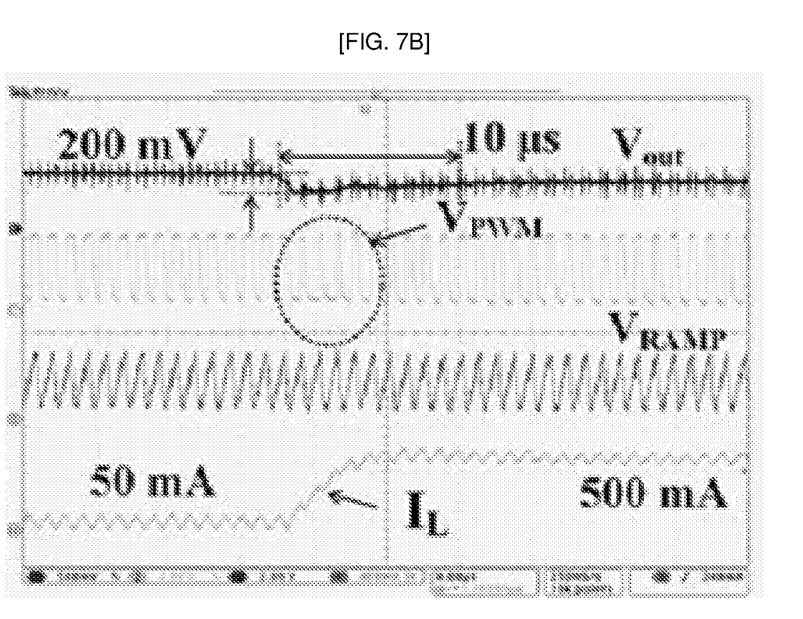
Figure 7C:
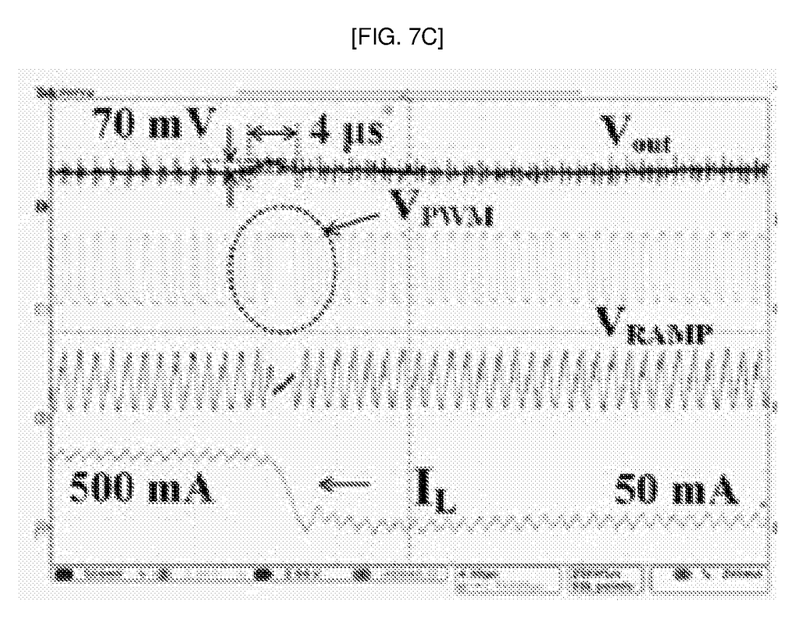
Figure 7D:
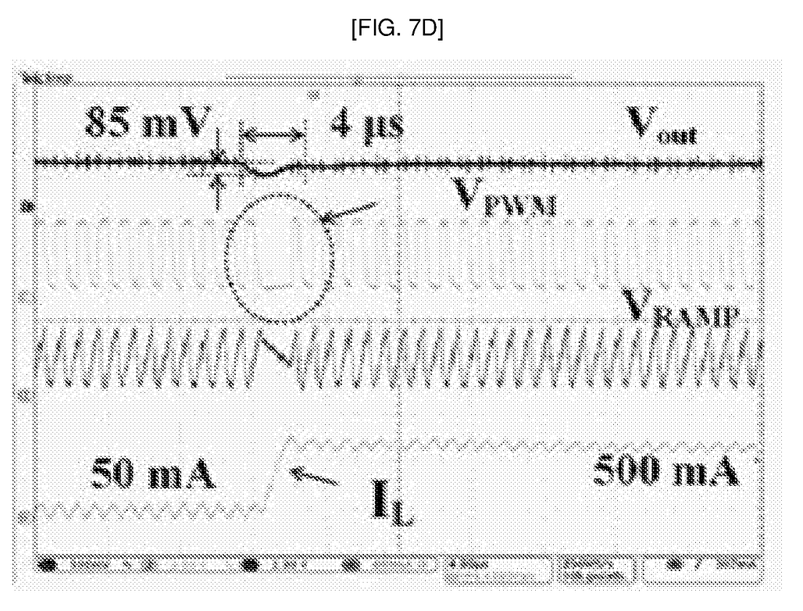

FIGS. 7A and 7B are measurement waveforms of the related art and FIGS. 7C and 7D are measurement waveforms of the present disclosure. As illustrated in the measurement result, it shows that the undershoot/overshoot and the response speed are improved.

FIG. 8 is a measurement waveform in accordance with a transient step size of a load current according to an embodiment of the present disclosure.

Figure 8A:
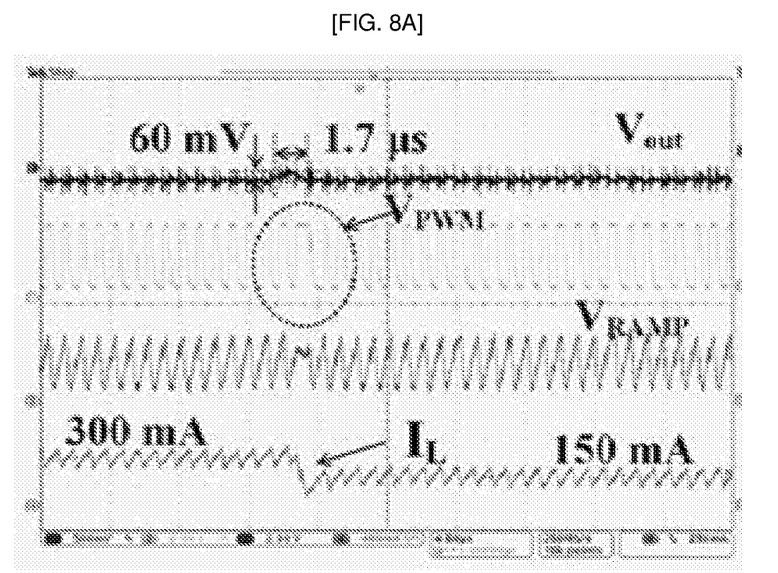
FIGS. 8A to 8D are measurement waveforms in accordance with a transient step size of a load current according to an embodiment of the present disclosure.
Figure 8B:
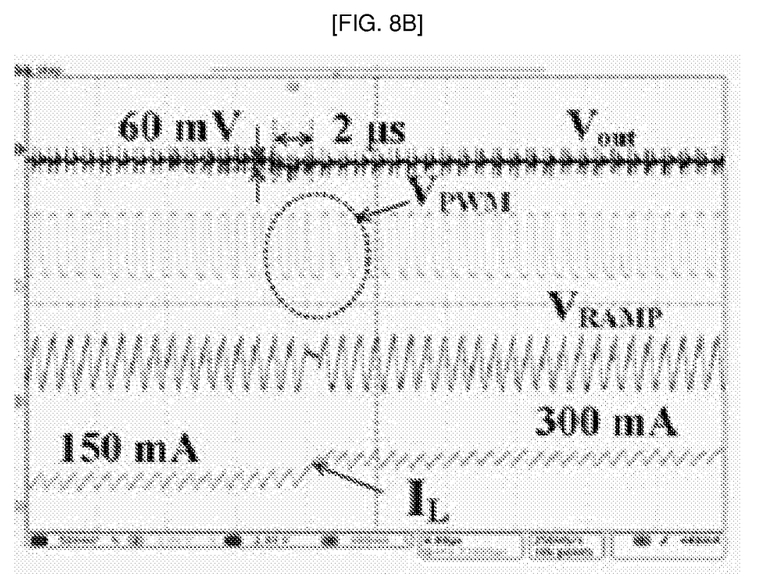
Figure 8C:
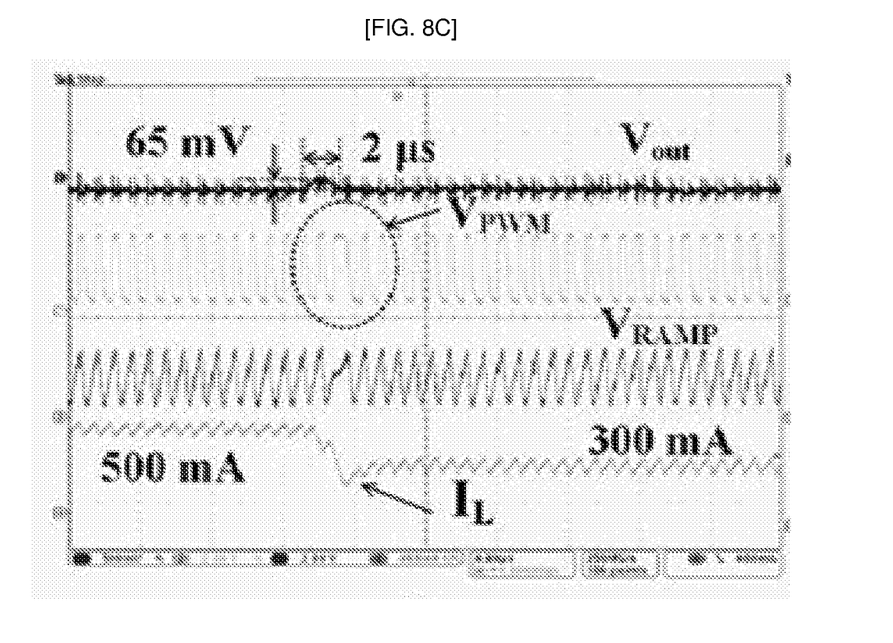
Figure 8D:
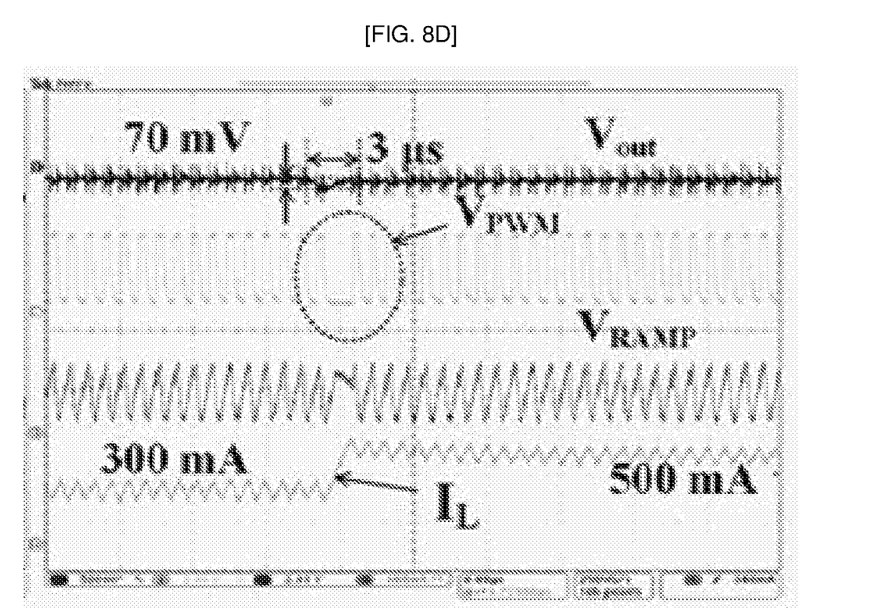

FIGS. 8A and 8B are measurement waveforms of 150 mA load transient step and FIGS. 8C and 8D are measurement waveforms of 200 mA load transient step. As illustrated in the measurement result, when $V_{out}$ is 60 mA or higher and an undershoot/overshoot occurs, the buck converter of the present disclosure provides a full duty, so that as compared with the circuit of the related art, the undershoot/overshoot is small and the response speed is fast.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A buck converter, comprising:
   a voltage converter configured to convert an input voltage into an output voltage by a driving signal;
   a compensator configured to generate an error compensation signal by receiving a feedback signal defined from the output voltage;
   an active ramp controller configured to generate a ramp signal by adjusting a ramp bias voltage when a load transient occurs; and
   an output voltage controller configured to adjust the output voltage using the ramp signal and the error compensation signal,
   wherein when the load transient occurs, the active ramp controller generates a ramp signal such that a waveform of a ramp signal tracks a shape of an output waveform of the compensator by adjusting the ramp bias voltage.

2. The buck converter of claim 1, wherein the voltage converter includes:
   a switching unit configured by at least one switch transistor; and
   a filter unit configured to generate an output voltage by being supplied with a current from the switching unit.

3. The buck converter of claim 1, wherein the active ramp controller includes:
   a transient detector configured to determine a load transient state based on a difference between the output voltage and a reference voltage and output a transient state signal in accordance with a determination result;
   a ramp bias generator configured to adjust the ramp bias voltage based on the error compensation signal when the load transient occurs;
   a ramp bias selector configured to select the ramp bias voltage generated from the ramp bias generator when the transient state signal is received; and
   a ramp generator configured to generate a ramp signal which tracks the error compensation signal based on the selected ramp bias voltage.

4. The buck converter of claim 3, wherein the transient detector includes:
   an amplifier configured to generate an amplification signal $V_{CON}$ by amplifying a difference between an output signal associated with the output voltage and a reference signal;
   first and second comparators configured to compare the amplification signal with an over threshold bias voltage $V_{B\_over}$ or an under threshold bias voltage $V_{B\_under}$ to generate an overshoot transient detection signal TD_A or an undershoot transient detection signal TD_B; and
   an OR gate configured to determine whether a transient state occurs through outputs of the first and second comparators.

5. The buck converter of claim 4, wherein when the amplification signal is higher than the over threshold bias voltage $V_{B\_over}$, the first comparator outputs an overshoot transient detection signal to be high and when the first comparator outputs the overshoot transient detection signal to be high, the OR gate outputs the transient state signal to be high.

6. The buck converter of claim 4, wherein when the amplification signal is lower than the under threshold bias voltage $V_{B\_under}$, the second comparator outputs an undershoot transient detection signal to be high and when the second comparator outputs the undershoot transient detection signal to be high, the OR gate outputs the transient state signal to be high.

7. The buck converter of claim 3, wherein the ramp bias generator includes:
   a first level shifter which when overshoot occurs, shifts a level of the error compensation signal to generate a first high ramp bias voltage and a first low ramp bias voltage and
   a second level shifter which when undershoot occurs, shifts a level of the error compensation signal to generate a second high ramp bias voltage and a second low ramp bias voltage.

8. The buck converter of claim 7, wherein when overshoot occurs, the ramp bias selector selects the first high ramp bias voltage and the first low ramp bias voltage as ramp bias voltages and when undershoot occurs, the ramp bias selector selects a second high ramp bias voltage and a second low ramp bias voltage as ramp bias voltages.

9. The buck converter of claim 3, wherein the ramp generator includes:
   a capacitor $C_{RAMP}$ into which a bias current $I_{BIAS}$ flows;
   an SR latch which when the voltage of the ramp signal $V_{RAMP}$ rises by the bias current to a high bias voltage $V_H$ selected by the ramp bias selector, outputs a reset signal and when the voltage of the ramp signal is lowered to a low bias voltage $V_L$ selected by the ramp bias selector, causes the reset signal to be off; and
   a reset transistor $M_{RESET}$ which is turned on by the reset signal to lower a voltage of a ramp signal and when the reset signal is off, is turned off to raise the voltage of the ramp signal so that the ramp signal is output, and
   the ramp signal is a signal having a shape corresponding to an error compensation signal.

10. A buck converter, comprising:
    a voltage converter configured to convert an input voltage into an output voltage by a driving signal;
    a compensator configured to generate an error compensation signal by receiving a feedback signal defined from the output voltage;
    an active ramp controller configured to generate a ramp signal by adjusting a ramp bias voltage when a load transient occurs; and
    an output voltage controller configured to adjust the output voltage using the ramp signal and the error compensation signal,
    wherein the active ramp controller includes:
    a transient detector configured to determine a load transient state based on a difference between the output voltage and a reference voltage and output a transient state signal in accordance with a determination result;
    a ramp bias generator configured to adjust the ramp bias voltage based on the error compensation signal when the load transient occurs;
    a ramp bias selector configured to select the ramp bias voltage generated from the ramp bias generator when the transient state signal is received; and
    a ramp generator configured to generate a ramp signal which tracks the error compensation signal based on the selected ramp bias voltage.

11. The buck converter of claim 10, wherein the transient detector includes:
    an amplifier configured to generate an amplification signal $V_{CON}$ by amplifying a difference between an output signal associated with the output voltage and a reference signal;
    first and second comparators configured to compare the amplification signal with an over threshold bias voltage $V_{B\_over}$ or an under threshold bias voltage $V_{B\_under}$ to generate an overshoot transient detection signal TD_A or an undershoot transient detection signal TD_B; and
    an OR gate configured to determine whether a transient state occurs through outputs of the first and second comparators.

12. The buck converter of claim 11, wherein when the amplification signal is higher than the over threshold bias voltage $V_{B\_over}$, the first comparator outputs an overshoot transient detection signal to be high and when the first comparator outputs the overshoot transient detection signal to be high, the OR gate outputs the transient state signal to be high.

13. The buck converter of claim 11, wherein when the amplification signal is lower than the under threshold bias voltage $V_{B\_under}$, the second comparator outputs an undershoot transient detection signal to be high and when the second comparator outputs the undershoot transient detection signal to be high, the OR gate outputs the transient state signal to be high.

14. The buck converter of claim 10, wherein the ramp bias generator includes:
    a first level shifter which when overshoot occurs, shifts a level of the error compensation signal to generate a first high ramp bias voltage and a first low ramp bias voltage and
    a second level shifter which when undershoot occurs, shifts a level of the error compensation signal to generate a second high ramp bias voltage and a second low ramp bias voltage.

15. The buck converter of claim 14, wherein when overshoot occurs, the ramp bias selector selects the first high ramp bias voltage and the first low ramp bias voltage as ramp bias voltages and when undershoot occurs, the ramp bias selector selects a second high ramp bias voltage and a second low ramp bias voltage as ramp bias voltages.

16. The buck converter of claim 10, wherein the ramp generator includes:
    a capacitor $C_{RAMP}$ into which a bias current $I_{BIAS}$ flows;
    an SR latch which when the voltage of the ramp signal $V_{RAMP}$ rises by the bias current to a high bias voltage $V_H$ selected by the ramp bias selector, outputs a reset signal and when the voltage of the ramp signal is lowered to a low bias voltage $V_L$ selected by the ramp bias selector, causes the reset signal to be off; and
    a reset transistor $M_{RESET}$ which is turned on by the reset signal to lower a voltage of a ramp signal and when the reset signal is off, is turned off to raise the voltage of the ramp signal so that the ramp signal is output, and
    the ramp signal is a signal having a shape corresponding to an error compensation signal.

* * * * *